(12) United States Patent
Haas

(10) Patent No.: US 6,422,662 B1
(45) Date of Patent: Jul. 23, 2002

(54) METHOD AND DEVICE FOR TRIGGERING A BRAKE SYSTEM PUMP

(75) Inventor: Hardy Haas, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/384,150

(22) Filed: Aug. 27, 1999

(30) Foreign Application Priority Data

Aug. 27, 1998 (DE) .......................................... 198 38 948

(51) Int. Cl.$^7$ ................................................. B60T 8/32
(52) U.S. Cl. ................ 303/155; 303/113.4; 303/DIG. 4
(58) Field of Search .......................... 303/116.1, 116.2, 303/10.11, DIG. 3, DIG. 4, 155, 113.4

(56) References Cited

U.S. PATENT DOCUMENTS

| | | | | |
|---|---|---|---|---|
| 5,217,284 A | * | 6/1993 | Willmann ..................... | 303/11 |
| 5,545,929 A | * | 8/1996 | Fijioka et al. ............... | 303/166 |
| 5,567,021 A | * | 10/1996 | Gaillard ....................... | 303/155 |
| 5,611,606 A | * | 3/1997 | Nell et al. .................... | 303/155 |
| 5,709,438 A | * | 1/1998 | Isakson et al. ............ | 303/113.4 |
| 6,123,395 A | * | 9/2000 | Wolf et al. .................. | 303/155 |

FOREIGN PATENT DOCUMENTS

| | | | | |
|---|---|---|---|---|
| DE | 195 01 760 | | 7/1996 | |
| DE | 198 48 248 | | 6/1997 | |
| GB | 2318844 | * | 5/1998 | ................. 303/155 |

* cited by examiner

Primary Examiner—Matthew C. Graham
(74) Attorney, Agent, or Firm—Kenyon & Kenyon

(57) ABSTRACT

Method and device for triggering a pressure medium delivery arrangement, in particular a pump, of a brake system. The triggering signal for the triggering or regulation of the pump is formed dependent upon at least one pressure differential. In one embodiment, at least one of three different pressure differentials is used for forming the triggering signal. For this purpose, the brake circuit pressure, the master brake cylinder path, and the master brake cylinder pressure are determined and used in the formation of target values. The pump or the pump motor is then regulated using the particular pressure differentials and/or is activated through a pilot control value.

20 Claims, 4 Drawing Sheets

METHOD AND DEVICE FOR TRIGGERING A BRAKE SYSTEM PUMP

FIELD OF THE INVENTION

The present invention relates to a method and device for controlling a pressure supplying arrangement of a brake system for delivering a pressure medium.

BACKGROUND INFORMATION

Conventional method and device for controlling an electro-hydraulic brake system pump are described in German Patent Application No. 195 48 248, which provides that the hydraulic fluid is introduced from an accumulator into the wheel brake cylinders via valves, the accumulator being charged by a pump. To achieve the quietest possible charging of the accumulator the pump is triggered using a pulse-pause relationship of a PWM signal suited to demand dependent on volume demand for hydraulic fluid and upon pressure in the accumulator. The PWM signal is changed depending on a specified pressure value and the deviation of the actual pressure from this value. A plurality of fixed pressure threshold values is used for proper triggering for proper delivery output. This German Patent Application specifically describes the triggering of a pump in an electro-hydraulic brake system.

In addition, conventional methods and devices describe that the return pumps of a hydraulic unit for an antilocking brake system (ABS), an automatic traction control system (ASR) or an electronic stability program (FDR, ESP) are triggered depending on the drivers braking intent. German Patent Application No. 195 01 760 describes such triggering action. In particular, this German Patent Application describes that the pressure in the master brake cylinder representing the activation of the brake pedal and thus the driver's intent is determined by a sensor. The return pump is triggered via a threshold value comparison so that a pressure reduction, pressure increase, or pressure maintenance condition results as needed.

In addition, there are a number of documents in which various configurations of brake systems with embedded pressure supply means, in particular pumps, are described.

The conventional methods and the corresponding conventional devices are not capable of delivering optimal results in every respect. Thus, while the desired target pressure is rapidly achieved by the conventional pump triggering methods and devices, the formation of a defined pedal movement and thus of a defined pedal feel resulting from a regulated pump intake pressure is neglected because the pressure is drawn from the master brake cylinder in an unmetered manner to build up the desired pressure. In addition, this leads, in suction operation of the pump, to a shift of the characteristic of the brake system. In addition, as a result of the high pump capacity and the cavitation effects which accompany the high pump at a partial output of the pump, noticeable noise develops.

SUMMARY OF THE INVENTION

The drawbacks of the conventional methods and devices are compensated for and additional advantages are achieved using a simultaneous use or an alternative use of different pressure differentials according to the present invention for the formation of the triggering signal or for control of the pressure supplying arrangement, in particular, of a pump or a pump motor.

According to the present invention, a rapid attainment of the target pressure and a defined pedal movement (and thus a defined pedal feel) are achieved. This takes place via a controlled use of the pressure applied at the input of the pressure supplying arrangement for regulation and/or pilot control. Through the selection of a characteristic which does not have a linear gain throughout between an actual pressure and a target pressure, but rather a partially non-linear gain, the pedal movement and the pedal feel can be precisely matched to the application conditions or the intent of the driver. In addition, as a result of the use of at least one second pressure differential for regulation and/or pilot control of the pressure supplying arrangement, in particular the pump, no noise is generated by cavitation effects since the pressure supplying arrangement is always adequately preloaded through the pedal pressure exerted by the driver. In addition, suction operation of the pressure supplying arrangement is avoided through the features described above, resulting that no shift of the characteristic takes place. In addition, as a result of precise regulation and/or pilot control in the pressure supplying arrangement, the pump motor operates at a lower speed, resulting overall in a lower electrical system load and a lower noise level.

DETAILED DESCRIPTION

Figure 1:
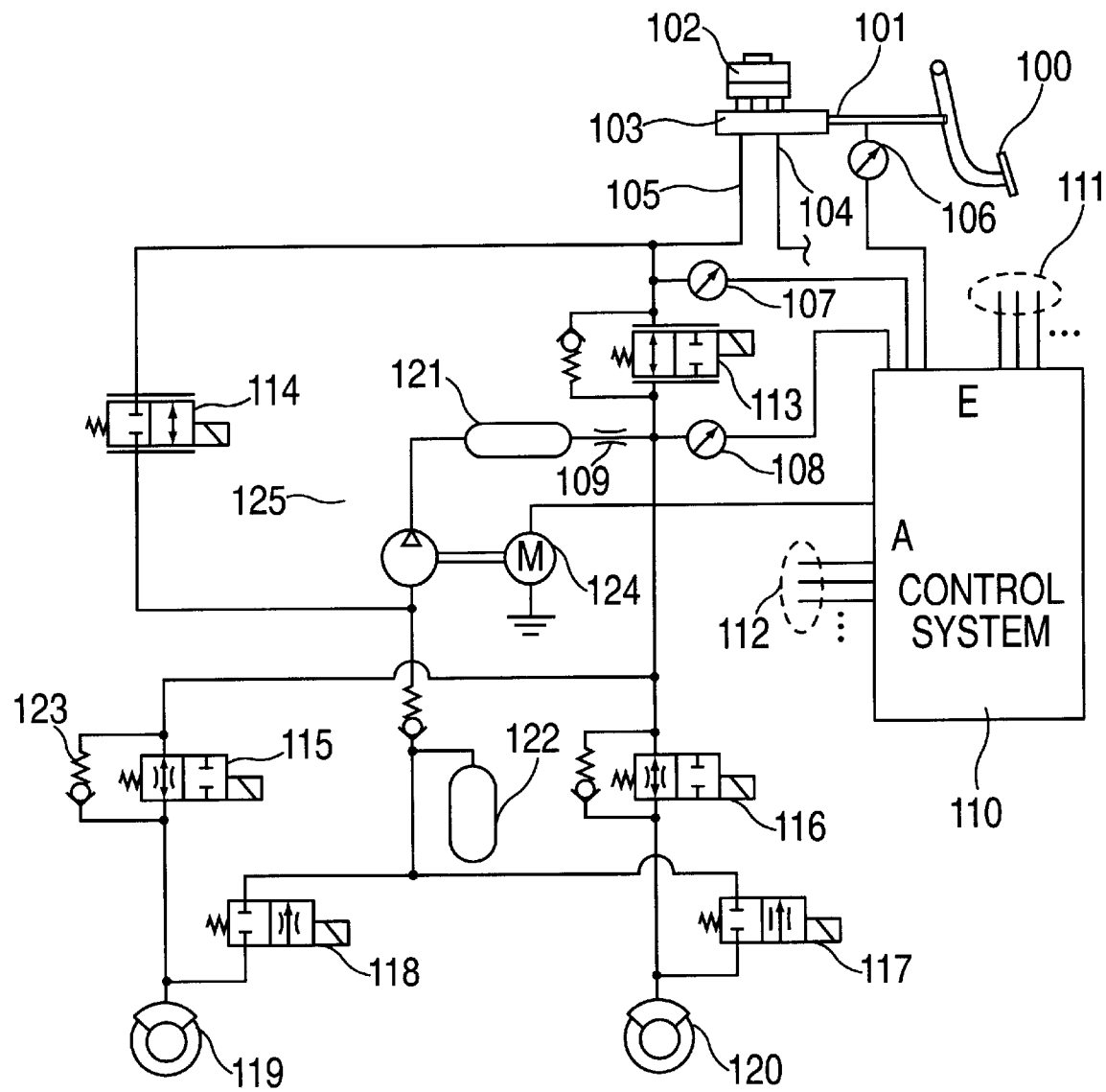
FIG. 1 shows an exemplary brake system with a control device, in which a return pump is triggered using at least one brake circuit.

FIG. 1 shows a hydraulic automobile brake system with a control system 110 which either includes a higher-order logic circuit (for example for ABS, ASR, FDR) or is connected to such a logic circuit. The driver feeds his braking intent into the brake system via a brake pedal 100. A master brake cylinder 103 via a piston rod 101. A vacuum brake booster may be interposed (or as described in this exemplary embodiment) with hydraulic brake boosting (HBV); thus a brake booster would no longer be necessary. A reservoir 102 is connected to master brake cylinder 103 which, in this case, has two circuits. For reasons of clarity, only one brake circuit is connected via line 105. In a similar manner, a second brake circuit is connected via line 104. The path of the piston rod and/or the path traversed in master brake cylinder 103 is detected by a sensor 106. This path is referred to below as master brake cylinder path sHZ. In the brake circuit described below, a pressure sensor 107 is connected to master brake line 105, which detects the pressure in the pressure medium at the pump intake. As a result of master brake cylinder 103 being connected to the pump intake via a valve arrangement 114, when a preloading valve 114 is in the open position, the pump intake pressure corresponds to master break cylinder pressure pHZist. Pressure sensor 107 can either be used for only one brake circuit or for several brake circuits, since the boost pressure developed, which corresponds to master brake cylinder pressure pHZist in all lines (e.g., lines 104, 105) originating from master brake cylinder 103, is present. In a similar manner, an individual pressure sensor for detection of pump entry pressure and/or master brake cylinder pressure can be provided for each brake system.

Pressure medium is introduced into the brake circuit via the preloading valve 114. Such controllable direction control valves as the preloading valve 114 are configured as, for example, electromagnetically controllable 2/2-port direction control valves and are mounted between master brake cylinder 103 and return pump 125. A damper chamber 121 is connected to the output of return pump 125. A choke 109 follows in the direction toward master brake cylinder 103 as well as toward the respective brake pressure booster valves, i.e., intake valves 115, 116 into the wheel brakes. The pressure medium leaves the brake circuit through an additional 2/2-port direction control valve 113. The outflow of the pressure medium could also be controlled via a combination of changeover valve and pressure limiting valve at the same location as valve 113. Other valve combinations can generally also be used in the brake system for inflow and/or outflow and/or flow rate of pressure medium.

For the sake of clarity, all safety valves are shown in FIG. 1 in the form of a check valve 123. However, such configuration not required according to the present invention and thus depending on the situation, different valves or combinations of valves can be used in connection with this safety function. All safety valves utilized may be designated as the check valve 123. Valve 113 can be bypassed through a check valve, so that in the case of automatic brake operation, in the event of sufficient activation of brake pedal 100, pressure can propagate from master brake cylinder 103 to the valve arrangements 115 through 118 for brake pressure modulation. Of these brake valve arrangements, the arrangements 115 and 116 are designated as intake valves of the respective wheel brake cylinders 119 and 120 and the valve arrangements 118 and 117 are designated as outflow valves. Also mounted in the pressure line which leads from outflow valves 117 and 118 to return pump 125 is a pressure reservoir 122. Return pump 125 is driven by a motor 124. Downstream from a choke 109, an additional pressure sensor 108 is mounted in the brake line. The exact position of the respective wheel brake cylinder 119 or 120 is intentionally not specified since for the methods and devices according to the present invention, no specific arrangement such as x-shaped or parallel partitioning of the brake circuit is necessary, but rather any arrangement can be used as needed.

The positions of the sensors are not fixed; it preferable that brake circuit pressure pBKist and pump intake pressure and/or master brake cylinder pressure pHZist and in addition, if needed, master brake cylinder path sHZ can be detected. Instead of using individual sensors for detection of pressure relationships (107, 108) and of master brake cylinder path sHZ (106), these values which are to be detected can also be estimated using a model or calculated in other ways.

The information content of the individual value to be detected by sensor system 106, 107, and 108 is provided to control system 110. The sensor system 106 provides input values, for example, for control system 110, such as wheel rotational speed sensors, gear rate sensor, etc. (which are not shown in FIG. 1). Thus, the additional input values which are known to a person having ordinary skill in the art are combined in FIG. 1 in trunk group 111. In a similar manner, on the outflow side, only the actuation of pump motor 124 is configured; additional control lines and connections also known to a person having ordinary skill in the art (but which are not essential to the present invention), such as lines which carry output signals for triggering the intake and outlet valves, are combined in trunk group 112 and are not described in greater detail.

The methods and device according to the present invention are described for a brake hydraulic system having a return pump and a hydraulic brake booster (HBV) and thus without a vacuum brake booster. However, the arrangement according to the present invention and the pressure lines with differing pressures or pressure reservoir for the detection of pressure differentials as well as a controllable, the pressure medium delivering arrangement can be found in a similar manner in other brake systems with various pressure media and configurations, for example with those having additional brake boosters. Thus the present invention can also be utilized in electro-hydraulic, hydraulic, electro-pneumatic, pneumatic, and comparable brake systems to improve the regulation of the pressure supplying arrangement.

Figure 2:
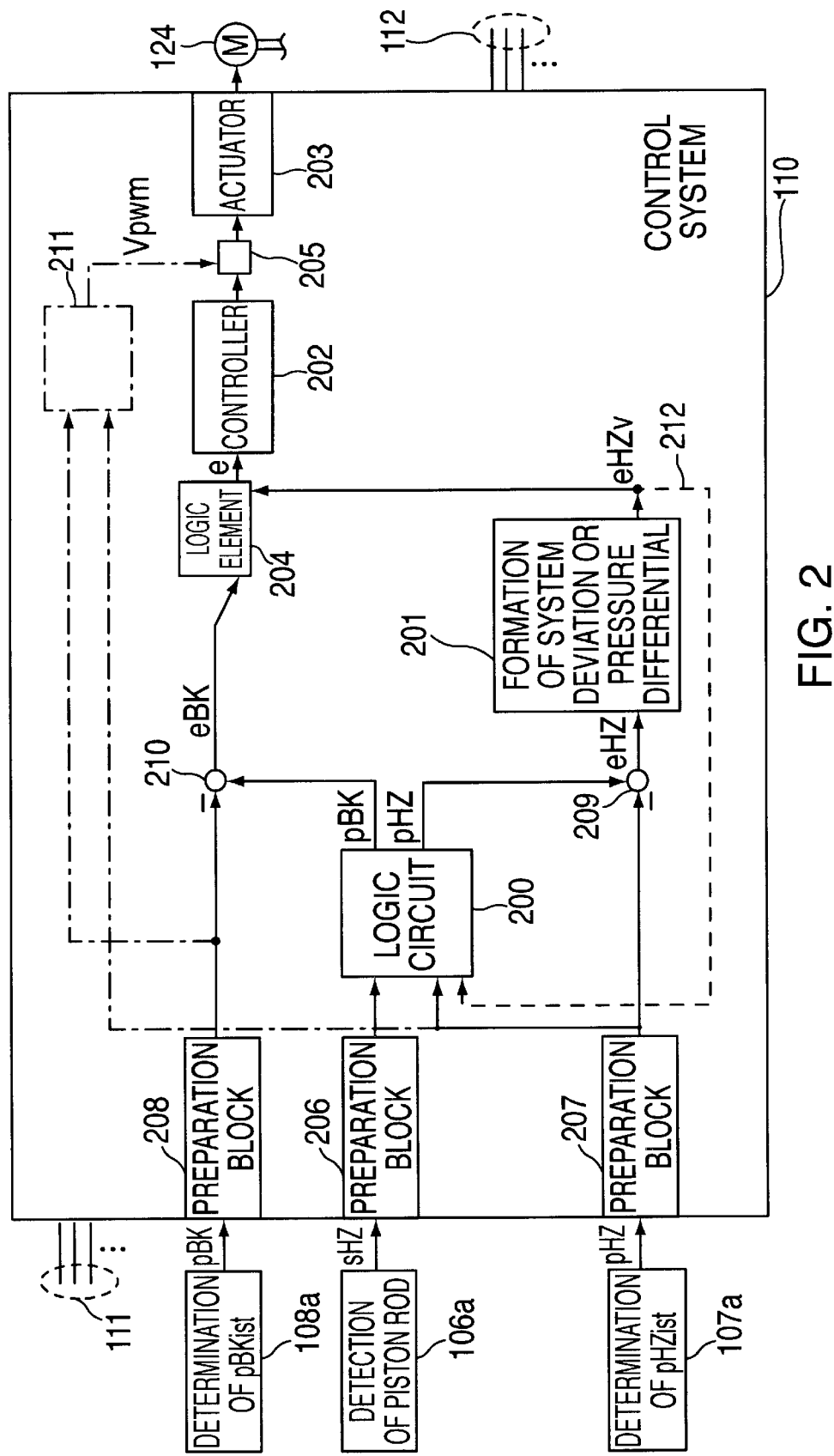
FIG. 2 shows a block diagram including sensors and a control system for regulating a pump motor.

FIG. 2 shows parts of the control system 110 of the present invention and their inputs and outputs in a block diagram. The sensor system illustrated in FIG. 1 is shown here as three blocks. In block 106a, the path of piston rod 101 from FIG. 1 or the master brake cylinder path eHZ is detected. Through blocks 107a and 108a, the actual master brake cylinder pressure pHZist and the actual brake circuit pressure pBKist is determined and brought to control system 110. This input information is prepared in adjacent blocks 206, 207, and 208 for further processing. In addition to the use of analog values, these values should be read in and processed, for example for use in a computer program. For the use of the values according to the present invention, the information contained in them is critical and thus can be used in an analog or digital form.

The information of master brake cylinder path sHZ and of master brake cylinder pressure pHZist is sent to a logic circuit, block 200. In block 200, the formation of target values takes place. In addition, block 200 can also include other functions; for example, the entire logic, e.g., for ABS, ASR FDR and/or HBV, can be contained in it. A target value formation in block 200 is determined according to the present invention, as described below. Thereafter, brake circuit target pressure pBKsoll and master brake cylinder target pressure pHZsoll are output to be regulated. Thus, the system deviation or pressure differential eBK is generated from brake circuit target pressure pBKsoll and brake circuit actual pressure pBKist at gate 210. In a similar manner, the system deviation or pressure differential eHZ in the master brake cylinder is generated from target master brake cylinder pressure pHZsoll and actual master brake cylinder pressure pHZist at gate 209. The terms used below, system deviation, system error, or pressure differential for eBK, eHZ, eHZv, or eBKHZ, are equivalent due to the fact that pressure deviations between target and actual pressure are corrected. In block 201, an adjusted or modified system deviation or pressure differential eHZv of system deviation eHZ is formed from system deviation eHZ. Modified pressure differential eHZv is provided, along with the pressure differential of brake circuit eBK, to logic element 204. From logic element 204, the definitive control deviation e, i.e., the definitive system deviation is brought to a controller in block 202. P-controller, PI-controller, state controller, etc., can be utilized as controllers. The use of a PID controller has proven to be advantageous. The output variable from block 202 is provided through 205 into block 203 which contains an actuator. In block 203 the ultimate triggering signal for pump motor 124 is then generated. For reasons of clarity, the drawing is cut off after pump motor 124; pump and brake hydraulics as well as also portions of control system 110 are not depicted in FIG. 2. Trunk lines 111 and 112 are described above and shown in FIG. 1.

In another embodiment, actual master brake cylinder pressure pHZist and at least one actual brake circuit pressure pBKist are provided to block 211. In a similar manner, a combination of pressure values of the connected brake circuits or both can also be used as the actual pressure value. The variable derived therefrom is injected into the control circuit upstream of block 203 via logic element 205.

In combination therewith or alternatively thereto, the modified system deviation or pressure differential eHZv can be used directly in block 200 via line 212 for target value generation. For this purpose, eHZv is injected via line 212 in block 200 in which case injection into logic element 204 can be omitted. Brake circuit target value pBKsoll in an exemplary embodiment is directly multiplied by eHZv, with other links also being possible.

Target value generation for pump regulation takes place in block 200. Brake circuit target value pBKsoll is determined for example from master brake cylinder actual value pHZist using a characteristic curve, for example, as will be described below with reference to FIG. 5.

In another embodiment, master brake cylinder path sHZ is used also either directly as a variable or in a correction variable SK1. Such correction variable SK1 is formed from the comparison of the path in the master brake cylinder sHZ and the master brake cylinder actual value pHZist. From master brake cylinder path sHZ, master brake cylinder actual pressure pHZist can easily be determined by a person skilled in the art, for example by a pressure-volume characteristic of the brake system, and conversely master brake cylinder path sHZ can be determined from the master brake cylinder actual pressure pHZist. The correction variable SK1 is then obtained from the difference, between the particular measured or estimated variable and the associated calculated variable, for example through division or subtraction.

Master brake cylinder target pressure pHZsoll which enters gate 209 for subtraction is generated from brake circuit target pressure pBKsoll which is determined by one of the aforementioned methods. This may also take place via a functional relationship, such as a characteristic curve. In a simple case, however, this can also take place through multiplication by a second correction factor SK2. Correction factor SK2 contains, in addition to other specifiable variables which can also be determined in advance, also the value of the desired pressure gain.

In another exemplary embodiment, brake circuit actual pressure pBKist can, in a similar manner, be utilized in forming target pressures pHZsoll and pBKsoll. In yet another exemplary embodiment, brake circuit actual pressure pBKist goes into correction values SK1 and/or SK2.

In addition to the pressure differential in brake circuit eBK, the system deviation in the master brake cylinder eHZ is also formed. The final linking of the two pressure or control differentials eBK and eHZ takes place in element 204. Multiplication of the system deviation in brake circuit eBK by the pressure differential eHZv modified from the system deviation of the master brake cylinder eHZ provides good results. However, any other functional linking of the two system deviations or pressure differences eBK and eHZv where e=f(eBK, eHZ) is also possible. Through the possible connection of master brake cylinder 103 to the pump intake, the pump intake pressure is the same as master brake cylinder pressure pHZist. Through linking system deviation eBK with modified pressure difference eHZv, both pump intake pressure and brake circuit pressure pHZist can be regulated. In block 203, the triggering signal for the pump motor, in particular a pulse-wide modulated triggering signal, is formed from the input signal.

Figure 3:
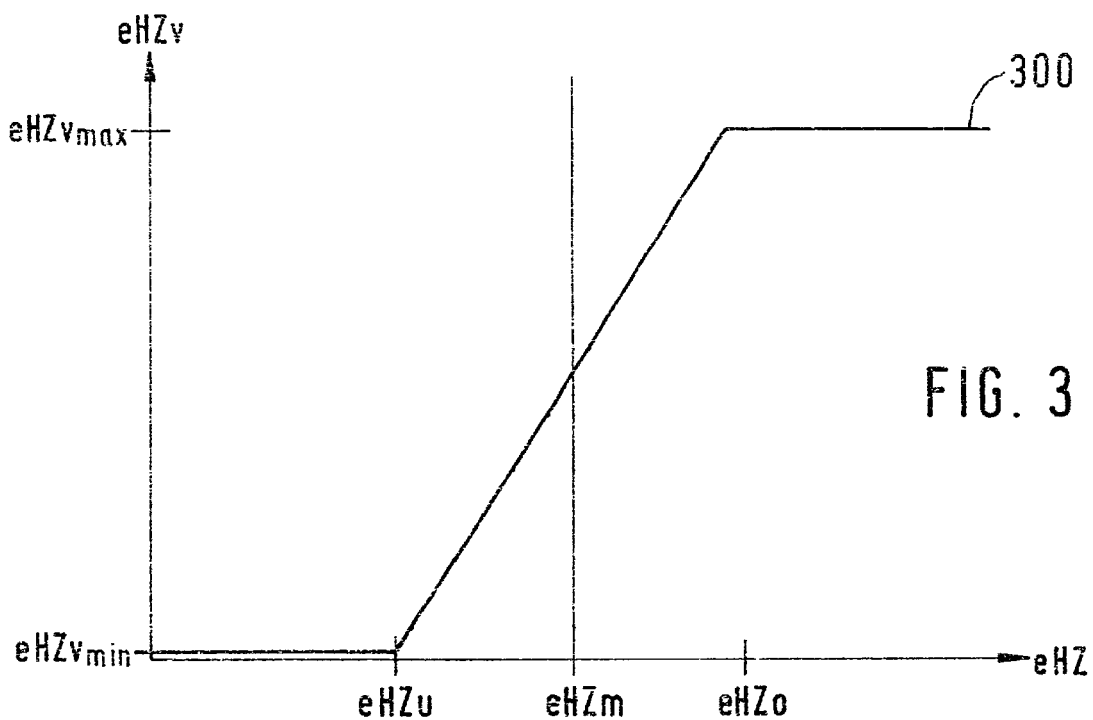
FIG. 3 shows a characteristic curve for a gain and adaptation of a system deviation with respect to a master break cylinder pressure.

FIG. 3 shows an exemplary embodiment for the functional relationship described above between pressure difference or system deviation in the master cylinder eHZ and the modified value eHZv formed therefrom in the form of a characteristic curve 300. In this connection, any other linking of eHZ and eHZv is also possible. In block 201, the input pressure difference eHZ in this embodiment is assigned to various output values eHZv depending on its value. This can take place in a discrete or a continuous manner.

For this purpose, characteristic curve 300 is subdivided into three sections. Following a section for values of eHZ smaller than a lower limit value eHZu comes a range with linear rise between lower limit value eHZu through a middle value eHZm to an upper limit value eHZo. Following this is a section for values of eHZ larger than upper limit value eHZo. In a preferred exemplary embodiment, lower limit value eHZu and upper limit value eHZo are arranged symmetrically around a middle value eHZm which corresponds to a system deviation eHZ of zero. eHZu is assigned a negative sign, which means that the corresponding pressure in master brake cylinder pHZist is greater than target specification pHZsoll. In contrast, upper limit value eHZo has a positive sign if target value pHZsoll is determined to be above actual master brake cylinder pressure pHZist.

A minimum value eHZvmin of pressure difference eHZv modified from eHZ is assigned to the section below lower limit value eHZu. Above an upper limit value eHZo a maximum value eHZvmax of modified pressure difference eHZv is assigned to pressure difference eHZ. Thus variable eHZv which is to be formed from system deviation or pressure difference eHZ can have a positive or a negative sign. In a preferred exemplary embodiment, however, eHZvmin corresponds to a zero value and maximum value eHZvmax corresponds to a value of one.

Value eHZv formed in this manner can now be utilized in a special embodiment directly for target value formation in block 200 via connection 212.

With block 211 shown in FIG. 2, a further exemplary embodiment contains an extension to the previous regulating system. Pilot control of the pump takes place through injection of a pilot control value Vpwm via block 211. It useful for pilot control value Vpwm to be derived from the pressure difference of at least one brake circuit pressure pBKist and master brake cylinder pressure pHZist. In the case of the use of multiple brake circuits, a mean value of brake circuit pressure, which is obtained through addition of the individual brake circuit pressures and division by their total number, can also be used in this pressure differential eBKHZ.

Figure 4:
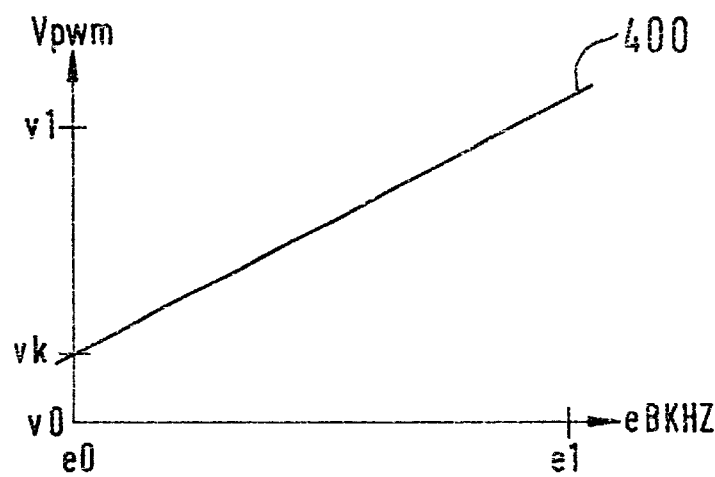
FIG. 4 shows a pilot control characteristic curve which may be utilized in another exemplary embodiment according to the present invention to affect a generation of a pilot control signal for triggering the pump motor using a difference between the master brake cylinder pressure and a brake system pressure.

FIG. 4 shows a characteristic curve 400 as an example of a functional relationship between pressure difference eBKHZ and pilot control value Vpwm. In this special embodiment, pressure differential eBKHZ and pilot control value Vpwm for two brake circuits with brake circuit pressures pBK1 and pBK2 is formed by $$Vpwm = vk + \frac{v1 - vk}{e1 - e0} \cdot eBKHZ \quad (1)$$

with $$eBKHZ = \frac{(pBK1 + pBK2)}{2} - pHZist \quad (2)$$

where v0, v1, and vk are specifiable pilot control values and e0, e1 are certain pressure differences eBKHZ. The product (pBK1+pBK2)/2 corresponds to actual value pBKist of a brake circuit in the preceding discussion. However, any other functional relationship is also conceivable here. Pilot value Vpwm is then linked via logic element 205 shown in FIG. 2 with the output value of block 202 and the resulting combination of the two values is brought to block 203 which contains an actuator.

Figure 5:
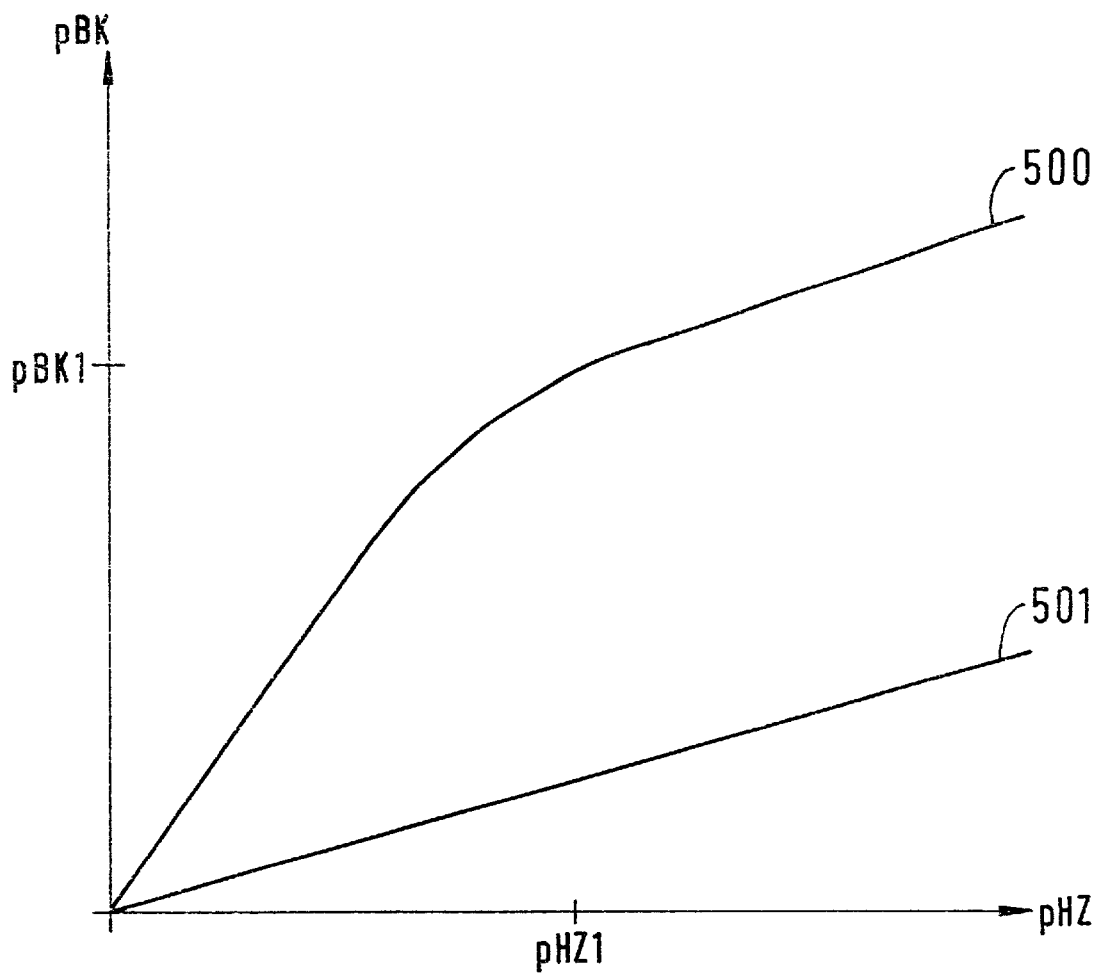
FIG. 5 shows two characteristic curves which are used for generating of a target value of the brake system pressure, one of the two characteristic curves illustrating a supplemental gain for optimizing a pedal movement.

FIG. 5 shows a preferred functional relationship between master brake cylinder pressure pHZist and brake circuit target pressure pBKsoll in the form of a characteristic curve 500, pBKsoll=f(pHZist). Characteristic curve 500 which is used has, up to a pressure value pHZ1 or pBK1, a gain much higher than linearly rising a characteristic curve 501 which includes a linear gain between actual pressure value pHZist and target pressure value pBKsoll in the brake circuit. Characteristic curve 500 used in this connection is freely selectable. In a preferred exemplary embodiment, above the value pHZ1 or pBK1, amplified characteristic curve 500 and unamplified characteristic curve 501 extend in parallel. With characteristic curve 500, a distinctly more defined pedal movement and thus a distinctly improved pedal feel is implemented since the pedal force is adjusted to the pressure. In addition through selection of characteristic curve 500, as in the exemplary embodiment shown in FIG. 5, it is possible even with a hydraulic brake gain (HBV) to simulate a vacuum brake booster which is not present, as a result of which the driver is presented with an adjusted pedal movement.

What is claimed is:

1. A method for triggering a pressure medium delivery arrangement of a brake system, comprising the steps of:
   providing at least one of a first pressure differential, a second pressure differential and a third pressure differential; and
   generating a triggering signal as a function of at least one of the first pressure differential, the second pressure differential and the third pressure differential for triggering the pressure medium delivery arrangement,
   wherein the first pressure differential is between a first target setpoint value and a first actual pressure value at an intake of the pressure medium delivery arrangement,
   wherein the second pressure differential is between a second target setpoint value and a second actual pressure value in at least one brake circuit, and
   wherein the third pressure differential is between the first actual pressure value and the second actual pressure value.

2. The method according to claim 1, wherein the at least one brake circuit includes a plurality of brake circuits, and further comprising the step of:
   performing at least one substep of:
      determining at least one of the second target setpoint value and the second actual pressure value of the second pressure differential separately for each of the brake circuits, and
      forming at least one of the second target setpoint value and the second actual pressure value by combining respective actual pressure values of the brake circuits.

3. The method according to claim 2, further comprising the step of:
   generating a mean value of the respective actual pressure values of the brake circuits by:
      adding the respective pressure values to form a result, and
      dividing the result by a number of the brake circuits.

4. The method according to claim 1, further comprising the step of:
   generating at least one pilot control value as a function of the third pressure differential, wherein the triggering signal is generated in an actuator as a function of the at least one pilot control value.

5. The method according to claim 1, further comprising the step of:
   adjusting the first pressure differential using a characteristic curve to generate a modified pressure differential.

6. The method according to claim 1, wherein at least one setpoint value of the first and second target setpoint values is formed as a function of at least one of a braking intent of a driver, the first actual pressure value and the second actual pressure value.

7. The method according to claim 6, wherein the braking intent of the driver is provided via a brake pedal path.

8. The method according to claim 1,
   wherein the first target setpoint value corresponds to a target pressure value of a master brake cylinder of the brake system, and
   wherein the first actual pressure value correspond to an actual pressure master value of the master brake cylinder.

9. The method according to claim 1, wherein the pressure medium delivery arrangement includes a pump.

10. A device comprising:
    a control system generating a triggering signal which triggers a pressure medium delivery arrangement of a brake system, the control system generating the triggering signal as a function of at least one of a first pressure differential, a second pressure differential and a third pressure differential,
    wherein the first pressure differential is between a first target setpoint value and a first actual pressure value at an intake of the pressure medium delivery arrangement,
    wherein the second pressure differential is between a second target setpoint value and a second actual pressure value in at least one brake circuit, and
    wherein the third pressure differential is between the first actual pressure value and the second actual pressure value.

11. The device according to claim 9,
    wherein the at least one brake circuit includes a plurality of brake circuits,
    wherein the control system includes:
       a first arrangement adjusting the first pressure differential using a characteristic curve to generate a modified pressure differential,
       a second arrangement generating a pilot control value as a function of the third pressure differential, the triggering signal being generated as a function of the pilot control value in an actuator, and
       a logic circuit processing at least one of a braking intent of a driver, the first actual pressure value and the second actual pressure value for forming at least one of the first and second target setpoint values, and wherein at least one of the second target setpoint value and the second actual pressure value are formed at least one of:
separately for each of the brake circuits, and
using a combination of respective pressure values of the brake circuits.

12. The device according to claim 10, wherein the pressure medium delivery arrangement includes a pump.

13. A method for triggering a pressure medium delivery arrangement of a brake system, comprising the steps of:
providing at least one of a first pressure differential, a second pressure differential and a third pressure differential;
generating a triggering signal as a function of at least one of the first pressure differential, the second pressure differential and the third pressure differential for triggering the pressure medium delivery arrangement,
wherein the first pressure differential is between a first target setpoint value and a first actual pressure value at an intake of the pressure medium delivery arrangement,
wherein the second pressure differential is between a second target setpoint value and a second actual pressure value in at least one brake circuit, and
wherein the third pressure differential is between the first actual pressure value and the second actual pressure value; and
generating at least one pilot control value as a function of the third pressure differential, wherein the triggering signal is generated in an actuator as a function of the at least one pilot control value,
wherein the at least one brake circuit includes a first brake circuit and a second brake circuit,
wherein the first brake circuit provides a first respective pressure value (pBK1), and the second brake circuit provides a second respective pressure value (pBK2),
wherein the pilot control value is generated using at least one value of a characteristic curve from the third pressure differential and using the formula (pBK1+pBK2)/2,
wherein the characteristic curve is generated using the following equation:

$$Vpwm = vk + \frac{v1 - vk}{e1 - e0} \cdot eBKHZ, \text{ and}$$

wherein $$eBKHZ = \frac{(pBK1 + pBK2)}{2} - pHZist,$$

v0 is a first value of the at least one pilot control value,
v1 is a second value of the at least one pilot control value,
vk is a third value of the at least one pilot control value,
e0 is a first value of at least one of pressure differentials,
e1 is a second value of the pressure differentials, and
pHZist is the first actual pressure value.

14. A method for triggering a pressure medium delivery arrangement of a brake system, comprising the steps of:
providing at least one of a first pressure differential, a second pressure differential and a third pressure differential;
generating a triggering signal as a function of at least one of the first pressure differential, the second pressure differential and the third pressure differential for triggering the pressure medium delivery arrangement,
wherein the first pressure differential is between a first target setpoint value and a first actual pressure value at an intake of the pressure medium delivery arrangement,
wherein the second pressure differential is between a second target setpoint value and a second actual pressure value in at least one brake circuit, and
wherein the third pressure differential is between the first actual pressure value and the second actual pressure value; and
adjusting the first pressure differential using a characteristic curve to generate a modified pressure differential,
wherein the characteristic curve has:
a lower limit value which is attained by a first characteristic segment, a preset table value being assigned to the lower limit value,
an upper limit value which is a starting point for a third characteristic segment, a preset table value being assigned to the lower limit value, and
a mean value which is provided between the upper limit value and the lower limit value in a second characteristic segment of the characteristic curve, the second characteristic segment having a constant variation.

15. The method according to claim 14, wherein the mean value is provided symmetrically between the upper limit value and the lower limit value.

16. The method according to claim 15, wherein the second characteristic section has a constant linear rise starting from the table limit value up to the preset table value.

17. A method for triggering a pressure medium delivery arrangement of a brake system, comprising the steps of:
providing at least one of a first pressure differential, a second pressure differential and a third pressure differential;
generating a triggering signal as a function of at least one of the first pressure differential, the second pressure differential and the third pressure differential for triggering the pressure medium delivery arrangement,
wherein the first pressure differential is between a first target setpoint value and a first actual pressure value at an intake of the pressure medium delivery arrangement,
wherein the second pressure differential is between a second target setpoint value and a second actual pressure value in at least one brake circuit, and
wherein the third pressure differential is between the first actual pressure value and the second actual pressure value; and
adjusting the first pressure differential using a characteristic curve to generate a modified pressure differential, wherein the modified pressure differential is associated with the second pressure differential.

18. The method according to claim 17, wherein the modified pressure differential is multiplied by the second pressure differential to form a particular result.

19. A method for triggering a pressure medium delivery arrangement of a brake system, comprising the steps of:
providing at least one of a first pressure differential, a second pressure differential and a third pressure differential;
generating a triggering signal as a function of at least one of the first pressure differential, the second pressure differential and the third pressure differential for triggering the pressure medium delivery arrangement, wherein the first pressure differential is between a first target setpoint value and a first actual pressure value at an intake of the pressure medium delivery arrangement, wherein the second pressure differential is between a second target setpoint value and a second actual pressure value in at least one brake circuit, and wherein the third pressure differential is between the first actual pressure value and the second actual pressure value;

adjusting the first pressure differential using a characteristic curve to generate a modified pressure differential; and forming the second target set point value for the at least one brake circuit as a function of the modified pressure differential.

20. A method for triggering a pressure medium delivery arrangement of a brake system, comprising the steps of:

providing at least one of a first pressure differential, a second pressure differential and a third pressure differential;

generating a triggering signal as a function of at least one of the first pressure differential, the second pressure differential and the third pressure differential for triggering the pressure medium delivery arrangement, wherein the first pressure differential is between a first target setpoint value and a first actual pressure value at an intake of the pressure medium delivery arrangement, wherein the second pressure differential is between a second target setpoint value and a second actual pressure value in at least one brake circuit, and wherein the third pressure differential is between the first actual pressure value and the second actual pressure value;

wherein at least one setpoint value of the first and second target setpoint values is formed as a function of at least one of a braking intent of a driver, the first actual pressure value and the second actual pressure value;

wherein the at least one setpoint value is formed as a function of at least one value of the first and second actual pressure values using a first characteristic curve, the first characteristic curve having a rise up to a preset pressure value which is greater than a second characteristic curve, the second characteristic curve including a linear gain which is between at least one of the first and second actual pressure values and the at least one setpoint value; and wherein the first characteristic curve extends parallel to the second characteristic curve starting from the pressure value.

* * * * *

UNITED STATES PATENT AND TRADEMARK OFFICE
CERTIFICATE OF CORRECTION

PATENT NO.    : 6,422,662 B1
DATED         : July 23, 2002
INVENTOR(S)   : Hardy Hass It is certified that error appears in the above-identified patent and that said Letters Patent is hereby corrected as shown below:

Column 2,
Lines 32 and 67, change "break" to -- brake --.

Column 3,
Line 28, change "configuration not" to -- configuration is not --.

Column 4,
Line 15, change "as well as a controllable, the pressure medium delivering arrangement ..." to -- as well as a controllable pressure medium delivering arrangement ... --.

Column 7,
Line 24, change "linearly rising a characteristic curve 501" to -- linearly rising characteristic curve 501 --.

Signed and Sealed this

Twenty-fourth Day of June, 2003

JAMES E. ROGAN
*Director of the United States Patent and Trademark Office*